(12) United States Patent
Rothamel et al.

(10) Patent No.: US 6,639,206 B1
(45) Date of Patent: Oct. 28, 2003

(54) ROTARY ANGLE SENSOR FOR A ROTARY MEMBER

(75) Inventors: Karl L. Rothamel, Ober-Ramstadt (DE); Lorenz Lenhardt, Griesheim (DE)

(73) Assignee: Snap-On Deustchland Holding GmbH, Mettmann (DE)

( * ) Notice: Subject to any disclaimer, the term of this patent is extended or adjusted under 35 U.S.C. 154(b) by 0 days.

(21) Appl. No.: 09/661,466

(22) Filed: Sep. 13, 2000

(30) Foreign Application Priority Data

Sep. 28, 1999 (DE) .......................... 199 46 486
Apr. 25, 2000 (DE) .......................... 100 20 247

(51) Int. Cl.$^7$ .............................. G01D 5/34; G01D 5/36
(52) U.S. Cl. .............................. 250/231.13; 250/237 R; 356/616
(58) Field of Search ................ 250/231.13, 231.14, 250/231.16, 231.17, 231.18, 237 R; 33/707; 324/175; 341/13; 356/616

(56) References Cited

U.S. PATENT DOCUMENTS

| 3,770,970 | A | * | 11/1973 | Trump ................... 250/231 SE |
| 4,567,467 | A | * | 1/1986 | Wiblin et al. ............ 340/347 P |
| 4,650,995 | A | * | 3/1987 | Tokunaga et al. ...... 250/231 SE |
| 5,061,848 | A | * | 10/1991 | Choi .......................... 250/229 |
| 5,329,121 | A | * | 7/1994 | Leviton ................. 250/231.13 |
| 5,497,080 | A | * | 3/1996 | Kim ............................ 324/175 |
| 5,557,101 | A | * | 9/1996 | Choi ...................... 250/231.13 |
| 5,900,626 | A | * | 5/1999 | Ahn ....................... 250/231.13 |
| 6,194,709 | B1 | * | 2/2001 | Briggs et al. .......... 250/231.14 |
| 6,437,324 | B1 | * | 8/2002 | Braun et al. ........... 250/231.14 |

FOREIGN PATENT DOCUMENTS

JP    0015603    *    1/1989    ........... G01B/11/26

OTHER PUBLICATIONS

Merriam–Webster's Collegiate Dictionary, Tenth Edition, Merriam–Webster Incorporated, 2001, p. 1100.*

* cited by examiner

Primary Examiner—Stephone B. Allen
(74) Attorney, Agent, or Firm—Shook, Hardy & Bacon LLP (57) ABSTRACT

A rotary angle sensor for a rotary member such as a motor vehicle wheel comprises an emitter, and a plurality of reflectors arranged in the form of flat surfaces on a circular-cylindrical surface of the rotary member or of a rotational portion which in operation rotates with the rotary member, light emitted by the emitter being reflected by the reflectors and received by a detector. The detector produces corresponding signals which are evaluated in an evaluation arrangement for detection of the rotational angle involved.

26 Claims, 5 Drawing Sheets

ROTARY ANGLE SENSOR FOR A ROTARY MEMBER

FIELD OF THE INVENTION

The invention concerns a rotary angle sensor for a rotary member, for example for a motor vehicle wheel which requires balancing.

BACKGROUND OF THE INVENTION

One form of rotary angle sensor for a rotary member such as a motor vehicle wheel to be balanced includes an emitter for emitting a light beam, and, operatively associated therewith, reflectors which are arranged at equal angular spacings from each other in the form of reflective surfaces on a rotatable circular path. The reflectors reflect the light emitted by the emitter. The assembly includes at least one detector for receiving the reflected light and producing corresponding signals which are evaluated in an evaluation device connected to the at least one detector, for detecting the rotary angle of the rotary member. A rotary angle sensor of that kind can be found in the article by Ram S Krishnan et al, A Miniature Surface Mount Reflective Optical Shaft Encoder, Hewlett-Packard Journal, December 1996, pages 1 through 6. In that rotary angle sensor, the reflectors, to maintain their flat reflective surfaces, are arranged in an annular configuration on one side of a disk fixedly connected to the rotary member, for example a shaft, extending around the axis of rotation of the disk and the rotary member. That design configuration entails additional apparatus expenditure and requires space for a properly operative arrangement of the reflectors with respect to the emitter and the detector or detectors, as the reflective surfaces extend in a plane in perpendicular relationship to the axis of rotation.

Detecting an angular position, speed of rotation and direction of rotation of a main shaft on a balancing machine, for example for ascertaining unbalance of a motor vehicle wheel, involves the use of incremental sender arrangements in which light sensors are disposed in opposite relationship to one or more light sources, more especially for example in the form of light emitting diodes. Arranged between the light source or sources and the sensors is a disk with holes, slots or teeth, which rotates with the main shaft of the machine, in which respect attention may be directed to U.S. Pat. No. 4,457,172. Besides the additional angle encoding disk, an additional zero mark in the form of a hole, slot or tooth as well as an associated detector are required to ascertain the absolute angular positions of the rotary member. This arrangement also involves the elements which specify the angular increments, extending in a plane which is perpendicular to the axis of rotation.

SUMMARY OF THE INVENTION

An object of the present invention is to provide a rotary angle sensor for a rotary member, which involves a reduced amount of apparatus expenditure and which takes up a smaller amount of space.

Another object of the present invention is to provide a rotary angle sensor for use in relation to a rotary member such as a motor vehicle wheel to be balanced, which affords reliable operational results in terms of accurate incrementation in respect of angular positions while involving a simplified structure.

In accordance with the principles of the present invention the foregoing and other objects are attained by a rotary angle sensor for a rotary member such as a motor vehicle wheel to be balanced, comprising an emitter for emitting a light beam and reflectors which are arranged in the form of reflective surfaces on a circle rotatable about an axis of rotation at equal angular spacings from each other, for reflecting light emitted by the emitter. A detector receives the reflected light and produces corresponding signals. An evaluation device is connected to the detector to evaluate the signals for rotary angle detection. The reflectors are arranged at the periphery of a circular-cylindrical surface of a rotational portion which is adapted to rotate with the rotary member, or at a circular-cylindrical surface of the rotary member.

Upon rotation of the above-mentioned rotational portion or the rotary member, the reflective surfaces or reflective surface portions which are arranged in succession on the periphery of the circle are passed successively through the beam which is preferably continuously emitted by the emitter. The reflective surfaces or surface portions constituting the reflectors are of such a configuration in respect of their succession that they direct discrete reflected beams on to the detector. That provides for incrementation in respect of angular positions which correspond to the respective reflective surface portions. The respective surface portions can directly adjoin each other and may have a continuous reflective band or strip with features distinguishing the individual surface portions. For that purpose the respective surface portions may be of surface configurations which differ from the shape of a circular cylinder. It is however also possible to use circular-cylindrical surfaces for the respective surface portions, wherein the radius of the respective circular-cylindrical surface can differ from the radius of the circle which has the circular-cylindrical surface on which the surface portions are disposed. The radius of the respective surface portion may be between infinite, that is to say -a flat surface, and the radius of the circular-cylindrical surface on which the reflectors are arranged. It is however also possible for the surface portions to involve a parabolic or elliptical cross-section.

The reflective surface portions may also be of a convex or concave configuration, relative to the emitter or detector.

In a preferred feature the reflective surface portions may be arranged directly in a row with each other on a flexible band, with the flexible band being wrapped around the circular-cylindrical surface of the rotor or the rotational portion.

In a preferred embodiment of the invention the reflectors are formed at surfaces of lands which extend in parallel relationship with the axis of the circular-cylindrical surface. For that purpose the lands may be arranged between two strips of material and can be integrally joined thereto to form a band. The band has flat or curved surfaces in the region of the lands and the strips. When the band is bent to apply it to the circular-cylindrical surface, the surfaces of the strips match the circular-cylindrical shape. It will be appreciated however that the lands may retain their flat surfaces. The width of the lands, that is to say the extent thereof in the peripheral direction of the circular-cylindrical surface, is a fraction of a millimeter, for example about 0.3 mm. When the band with the lands having the reflectors is wrapped around the rotary member or around the rotational portion which is adapted to rotate with the rotary member, it does not in practice require any space as this arrangement provides that the diameter of the rotary member or rotational portion is only immaterially increased by the thickness of the band.

As noted above the reflectors are at equal angular spacings from each other.

To achieve an absolute angular relationship, an angular spacing which differs from the other equal angular spacings may be provided between two adjacent reflectors. That for example provides a zero marking.

The polygonal mirror configuration which is afforded in the structure according to the invention and whose reflectors, formed by reflecting surfaces, are arranged around the periphery of the circular-cylindrical surface, can also be formed from a rigid shaped portion, for example a molded portion, such as plastic material. The reflective surface portions of the reflectors can be produced by metal deposition, in particular galvanic metal deposition.

More particularly in a preferred feature of the invention the shaped portion can be an injection molding of plastic material in a sleeve configuration. The shaped portion can form the rotational portion which is adapted to rotate with the rotary member. As the reflective surface portions which are arranged directly in succession can be distinguished from each other by the detector, it is possible to use a continuous reflective coating.

Preferably, the light beam emitted on to the respective reflectors is focused so that its focal point is on the flat surface of each respective reflector. During the rotational movement, the beam reflected by a respective reflector is diverted within the surface of the respective reflector in dependence on the changing rotational angle and in that situation can be received by a plurality of detectors which are arranged in a row.

Instead of the plurality of detectors it is also possible for a detector to comprise a plurality of light-sensitive sensors, on which the reflected beam deflected by the respective reflector successively impinges during the rotational movement. The detectors or sensors are arranged in mutually juxtaposed relationship substantially in the direction of rotation. They may also be arranged in a rectilinear row but in a preferred feature they are disposed on a circular arc around the axis of rotation. A reversal in the direction of rotation of the rotary member can be detected by the light beam being directed for a longer period of time on to the sensor or detector at which the reversal in the direction of rotation takes place. The signals outputted by the detectors or sensors are correspondingly evaluated by the evaluation device.

Further objects, features and advantages of the invention will be apparent from the description hereinafter of embodiments of the invention.

DESCRIPTION OF PREFERRED EMBODIMENTS

Figure 1:
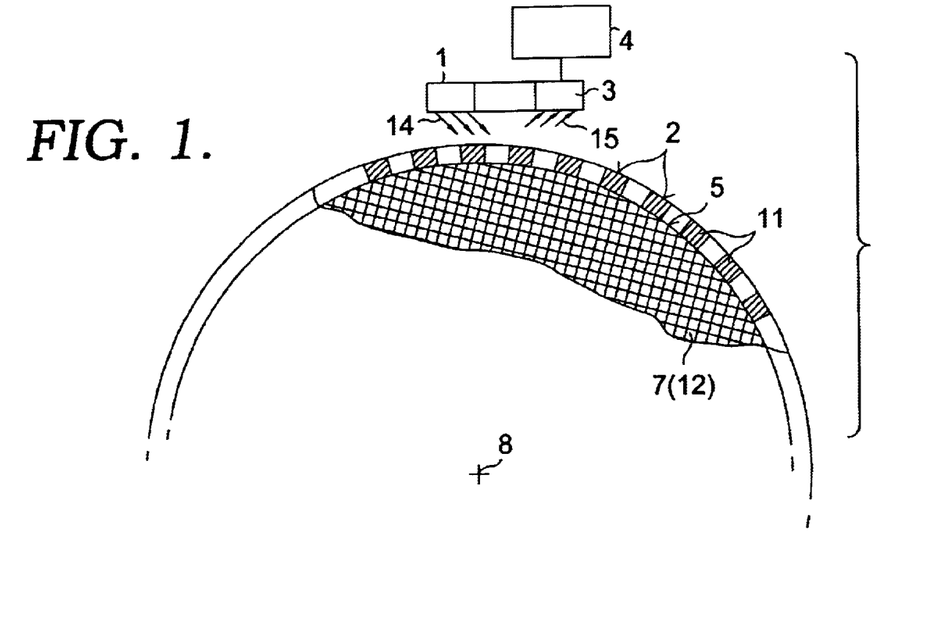
FIG. 1 is a diagrammatic view of an embodiment of a rotary angle sensor according to the invention, viewing in the axial direction thereof.

Referring firstly to FIG. 1, a rotary angle sensor for a rotary member, for example a motor vehicle wheel to be balanced, comprises an emitter 1 which preferably continuously emits light as indicated at 14 towards reflectors of which some are diagrammatically indicated at 2 in FIG. 1. The reflectors 2 reflect the light emitted thereto and the reflected light as indicated at 15 is then received by one or more detectors diagrammatically indicated at 3. The reflectors 2 are formed by discrete reflective surfaces or surface portions on a band which is indicated at 10 in FIG. 3 and are disposed for example on lands 11 which are disposed between two continuous strips 9 as shown in both FIGS. 2 and 3.

Figure 3:
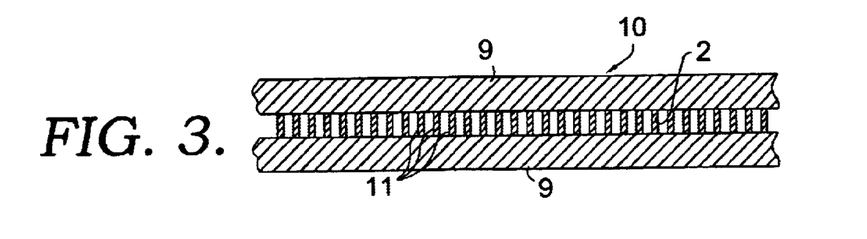
FIG. 3 shows a band with reflectors which can be used in the structure of the invention.

The band 10 can comprise metal such as hard nickel or a metallised plastic sheet or foil.

The surfaces of the two strips 9 and the lands 11 are of a planar configuration.

Figure 2:
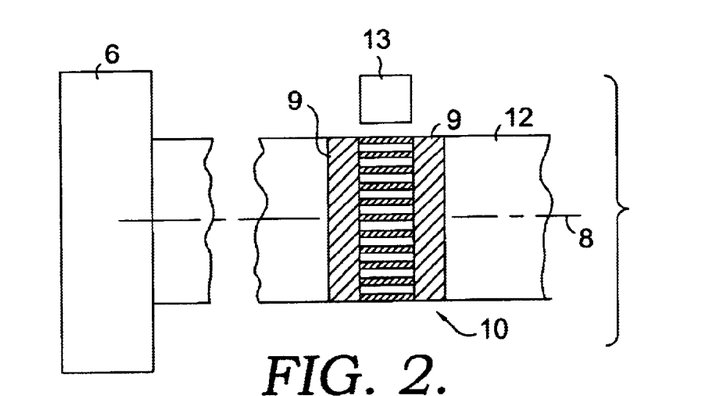
FIG. 2 is a view of the rotary angle sensor of FIG. 1, viewing, perpendicularly to the axial direction thereof.

To provide for angle encoding for a rotary member as indicated at 6 in FIG. 2, the band 10 is laid around a rotational portion 7 which for example can be in the form of a main shaft 12 of a wheel balancing machine. For that purpose the band 10 is disposed on a circular-cylindrical surface 5 of the rotational portion 7 or the main shaft 12 of the wheel balancing machine. The main shaft 12 or the rotational portion 7 are non-rotatably connected to the rotary member 6 which, as noted above, can be for example a motor vehicle wheel. The main shaft 12 or the rotational portion 7 are connected to the rotary member 6 in any suitable manner, by appropriate fixing and/or clamping means. It will be noted in this respect that if it is the unbalance of the main shaft 12 that is to be ascertained, then it is the main shaft 12 itself that constitutes the rotary member.

When the band 10 is arranged on the circular-cylindrical surface 5 of the rotational portion 7, the continuous strips 9 of the band 10 match the circular-cylindrical surface 5. The surfaces on the lands 11 and in particular the reflective outwardly or inwardly disposed surfaces which form the reflectors 2 maintain their flat or planar quality and act in the manner of a polygonal mirror, between whose reflective surfaces are disposed non-reflective portions in the peripheral direction of the circular-cylindrical surface 5. The above-described design configuration provides for equal angular spacings between the reflectors 2. The non-reflective portions between the reflectors 2 are produced by suitably removing material from the band 10, thereby affording the lands 11 which extend transversely across the space between the two strips 9 forming the lateral parts of the band 10. When the band is arranged on the circular-cylindrical surface 5 the lands 11 and the reflectors 2 formed thereon extend in the axial direction, that is to say parallel to the axis as indicated 8 in FIGS. 1 and 2 about which the rotary member 6 and the rotational portion 7 or the main shaft 12 rotate in operation of the assembly.

The lands 11 can be produced by any suitable procedure, for example the process known as electroforming. In that operation the metal band is coated with a photosensitive resist and the structures transferred on to the photoresist by subsequent exposure through a suitable mask. The metal structure is produced on the surfaces which are resist-free after the development procedure, by galvanic deposition and thus forming of the lands 11.

That provides the arrangement of a polygonal mirror around the circular-cylindrical surface of the rotational portion 7 or the main shaft 12 of a balancing machine, the rotational portion 7 or main shaft 12 being non-rotatably connected to a rotary member as indicated at 6 in the arrangement shown in FIG. 2. Upon rotation, the angular position of each respective mirror surface of a reflector 7 relative to the emitter 1 and the at least one detector 3 changes. The emitter 1 emits in particular focused light 14 on to the rotating circular-cylindrical surface 5. When that happens the light impinges on the reflective flat surfaces of the reflectors 2.

The reflectors 2 reflect the light which is incident thereon and the reflected light 15 is received by the at least one detector 3 which in response thereto is operable to produce a suitable signal. That signal is then evaluated in an evaluation device diagrammatically indicated at 4 in FIG. 1, which is connected to the detector 3, for rotational angle detection. Evaluation of the signals supplied by the detector 3 can also be effected to determine the speed of rotation and the direction of rotation of the rotary member 6.

In order to obtain an absolute angular reference in relation to the rotary member 6 or the rotational portion 7 or correspondingly the main shaft 12, the angular spacing between two reflectors 2 can differ from the equal angular spacings between the other reflectors. That provides for example a zero position at which for example a rotary angle counter of the rotary angle sensor is set to zero.

Figure 4:
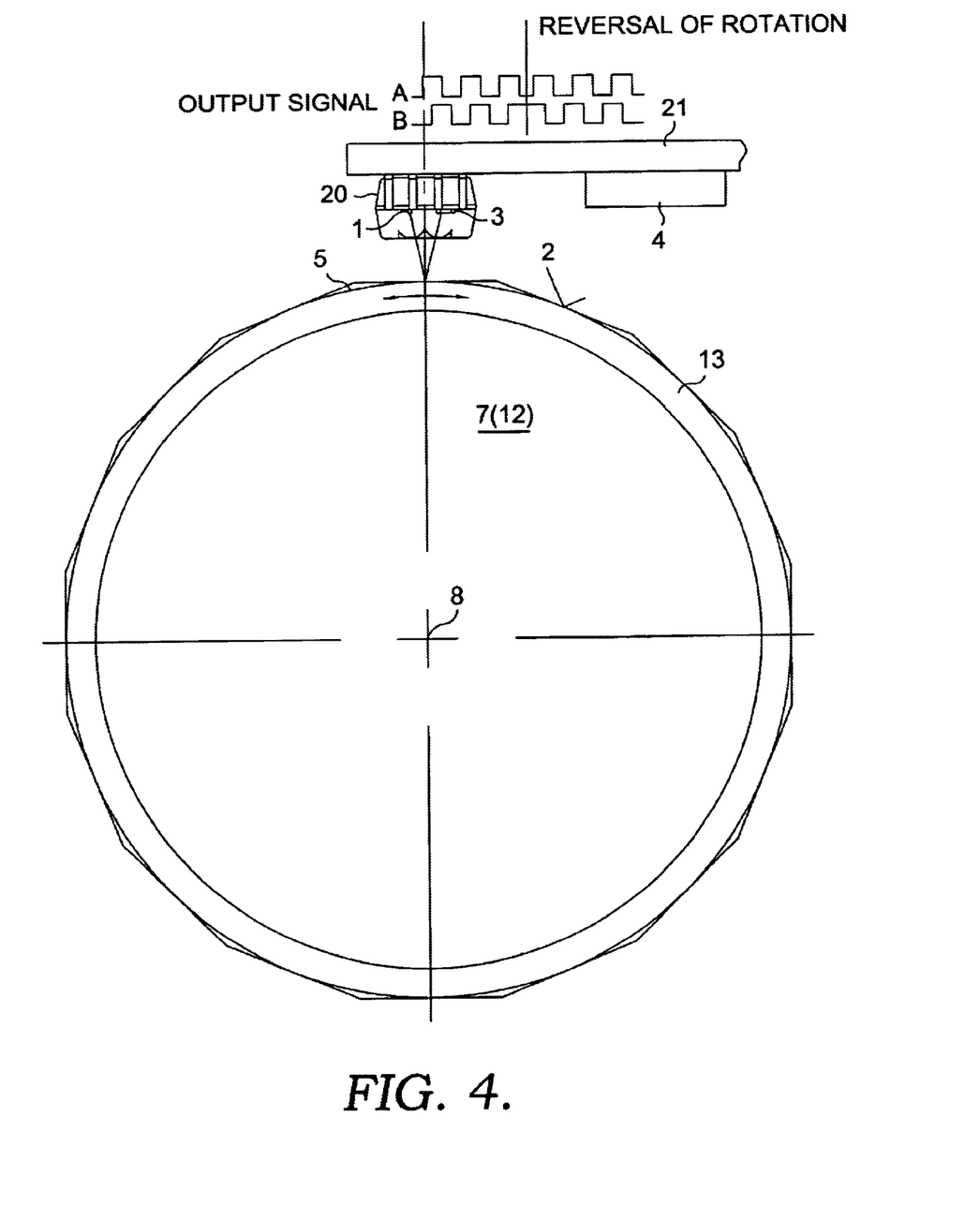
FIG. 4 is a partly sectional view of a second embodiment of the invention.
Figure 5:
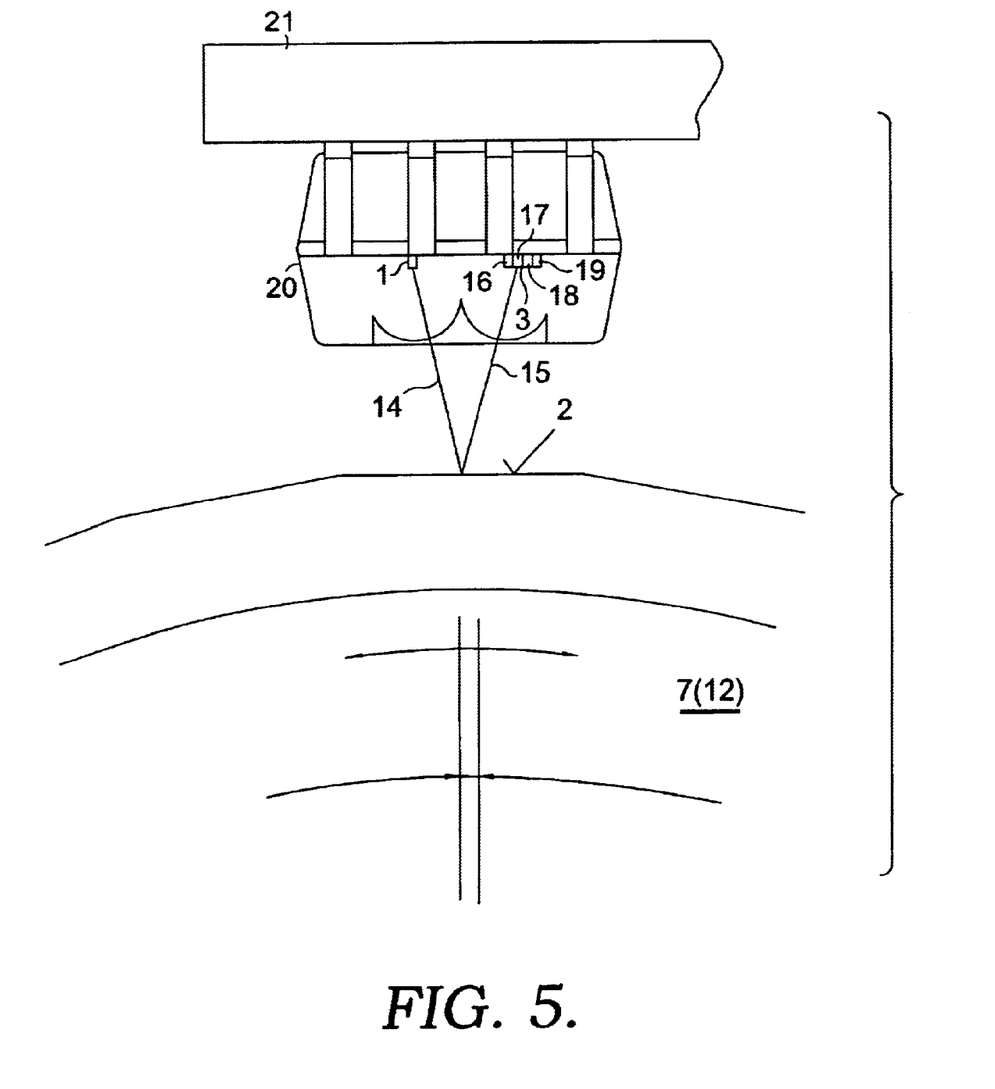
FIG. 5 is a detail view showing a part of the FIG. 4 embodiment.

Referring now to FIGS. 4 and 5, in the construction shown therein the reflectors 2 have flat surfaces formed at the outside of a rigid shaped portion 13. The shaped portion 13 preferably comprises an injection molding of plastic material and is of a generally sleeve-shaped configuration. The shaped portion 13 can be fitted on to a rotary member or a member or portion connected to the rotary member. In the embodiment illustrated in FIGS. 4 and 5 the shaped portion 13 is fitted on to the main shaft 12 of a balancing machine.

FIG. 4 also illustrates the output signals generated by the assembly upon rotation of the rotational portion 7 about the axis of rotation 8, further illustrating the location in the output signal configuration, which indicates a change in the direction of rotation of the rotational portion 7.

Figure 6:
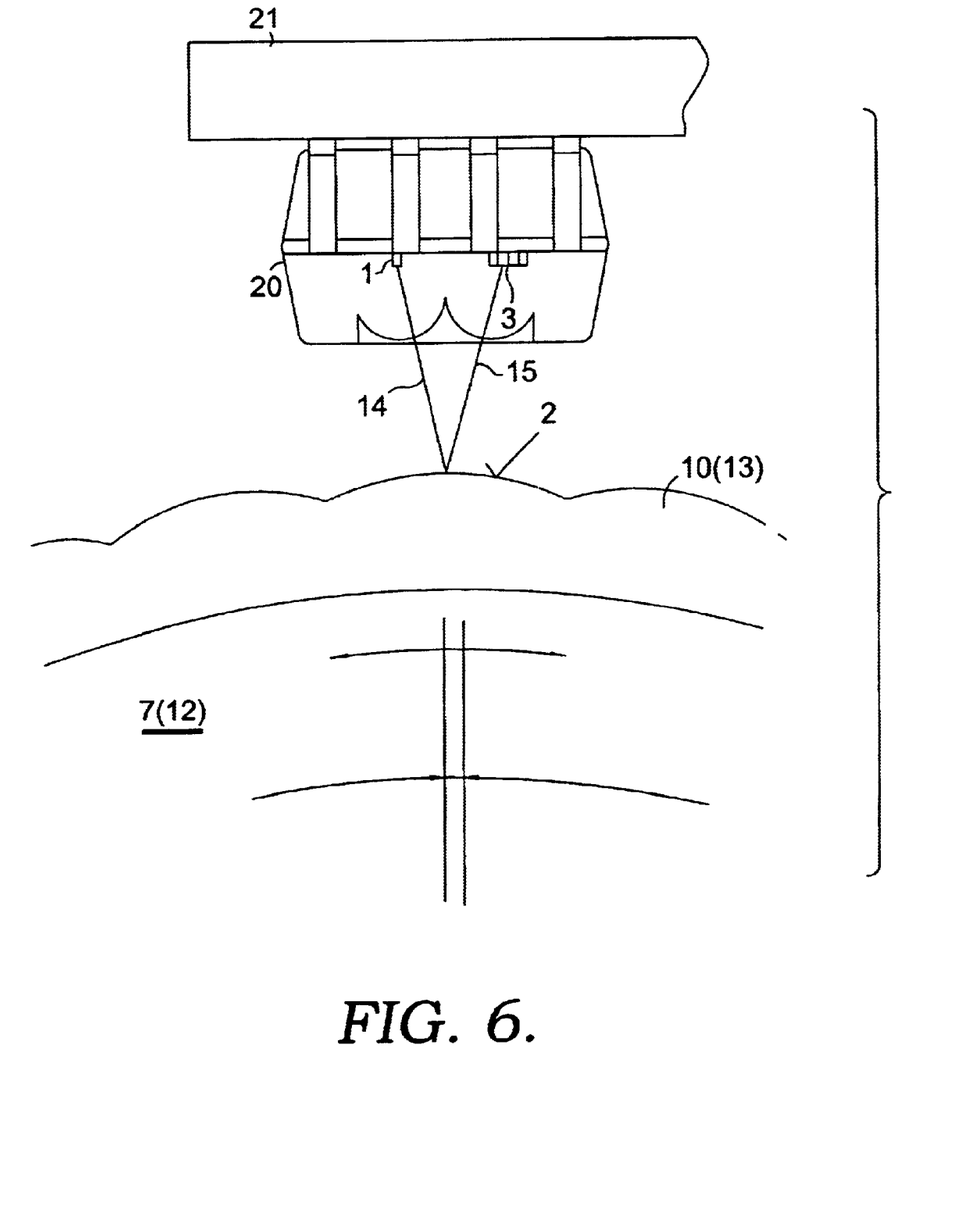
FIG. 6 is a view corresponding to FIG. 5 showing a third embodiment of the invention.
Figure 7:
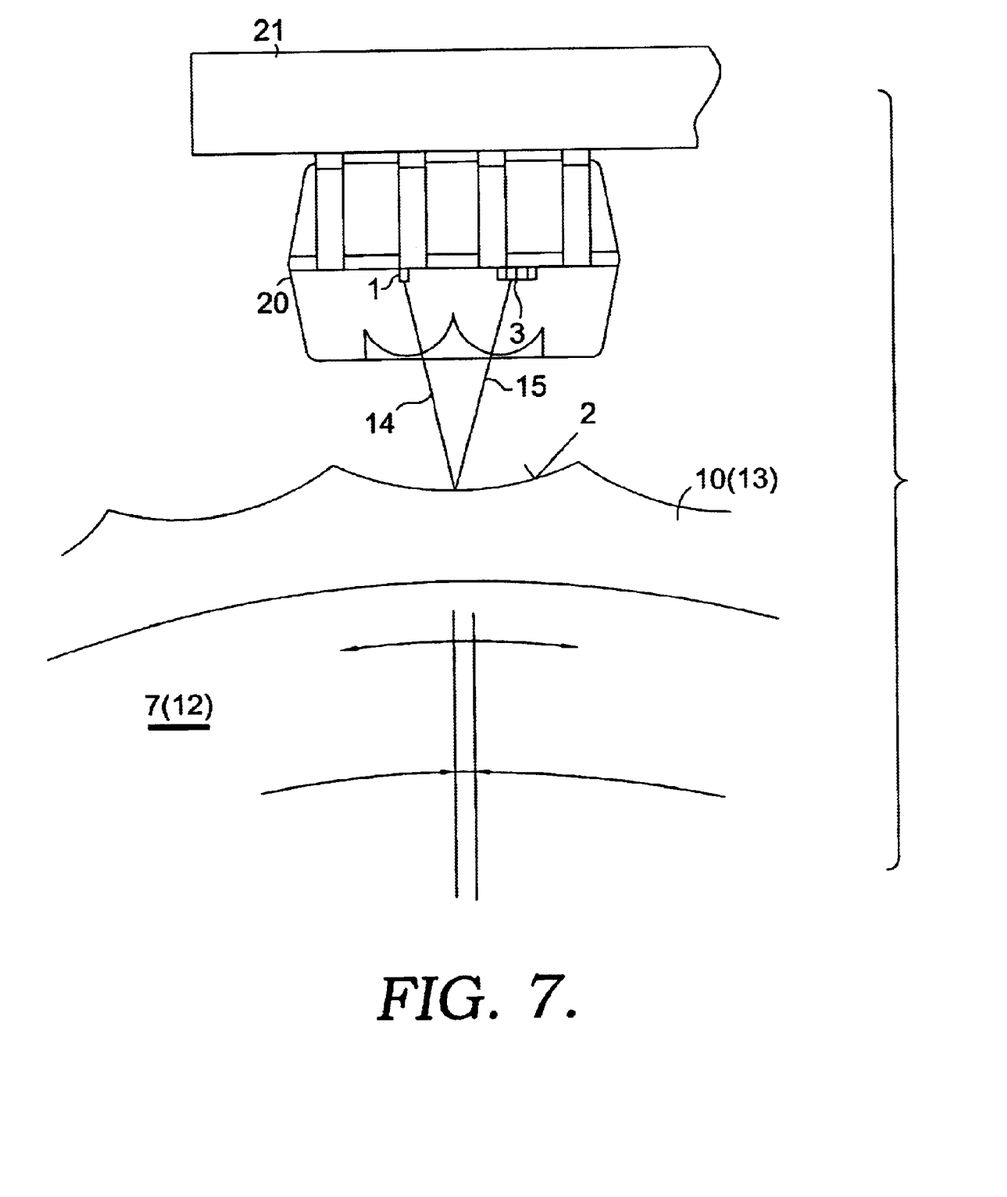
FIG. 7 is a view corresponding to FIGS. 5 and 6 showing a fourth embodiment of the invention.

Reference will now be directed to FIGS. 6 and 7 which show structures which are generally identical to each other. It will be seen however that, in the case of the arrangement shown in FIG. 6, the reflectors 2 are formed by surface portions which are curved convexly with respect to the emitter 1 or the detector 2, while the arrangement shown in FIG. 7 has surface portions 2 which are curved concavely with respect to the emitter 1 or the detector 3. The surface portions formed by the reflectors 2 in both FIGS. 6 and 7 can be arranged directly in a row with each other on a band 10 or a shaped portion 13 as described hereinbefore. The reflector property is achieved by means of a continuous reflective coating thereon. As the individual reflectors can be distinguished from each other geometrically at their mutually adjoining edges, this arrangement provides, even with a continuous reflective coating, discrete surface portions which, being distinguishable from each other, can be suitably evaluated in the evaluation device in order to determine the individual rotational angles involved therewith.

As shown in FIGS. 4 through 7, the emitter 1 and the detector 3 are arranged in a structural unit 20. The unit 20 is arranged together with the evaluation device 4 on a support plate indicated at 21 in FIGS. 4 through 7. As noted above, the emitter 1 emits a focused light beam indicated at 14 in for example FIG. 1 and also FIGS. 5 through 7 on to the respective reflector 2 which is in opposite relationship to the unit 20, as can be seen in greater detail for example in FIG. 6. Upon rotation of the rotational portion 7 about the axis of rotation 8, a beam 15 which is reflected by the respective reflector 2 is deflected at different deflection angles in dependence on the change in rotary angle and impinges on light-sensitive sensors which are indicated by way of example at 16, 17, 18 and 19 in FIG. 5 and which are arranged in mutually juxtaposed relationship in the deflection direction, being provided on the detector 3. Accordingly the beam 15 reflected by a respective reflector 2 successively impinges on the sensors 16 through 19 when the rotational portion 7 rotates in one direction. The first sensor 16 and the third sensor 18 are connected to a differential amplifier which as an output signal supplies the output signal identified by A in FIG. 4. The second sensor 17 and the fourth sensor 19 are connected to a further differential amplifier which supplies an output signal indicated at B in FIG. 4. In that way the differences in brightness at the respective sensors while a reflective surface of each reflector 20 moves past the unit 20 are appropriately evaluated.

When the rotary member 6 or the rotational portion 7 or main shaft 12 continues to rotate the reflected light beam no longer impinges on the sensors. However, in that situation the light beam 15 reflected by the next following reflector 2 again successively impinges on the sensors 16 through 19 upon the change in the angular position of the rotary member. In a preferred structure, there are 256 reflectors 2 provided at the periphery of the rotational portion 7 or the shaped portion 13. Absolute angular reference in relation to the rotary member 6 or the main shaft 12 can be obtained by an irregularity in the distribution of the reflective surfaces about the axis 8, as indicated above, for example by the spacing between two of the adjacent reflectors differing from the spacing between the reflectors of the other pairs distributed around the periphery of the circular-cylindrical surface of the rotational portion 7. The location at which there is the irregularity in distribution of the reflective surfaces about the axis 8 can be for example the zero location of the position counter in the rotary angle sensor.

A reversal in the direction of rotation of the rotational portion 7 can be detected by the instantaneous state of the output signal B in FIG. 4 being evaluated upon a change in the state of the output signal A.

The rotary angle sensor or incremental sensor in accordance with the invention is insensitive in relation to axial displacements. The number of signal lines and interference suppression filters can be reduced to a respective number of two. As already discussed above, the polygonal mirror formed by the reflectors can be in the form of a relatively thin sleeve portion or band which only immaterially increases the diameter of the rotational portion or rotary member. The rotary angle sensor is thus a compact arrangement.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. A rotary angle sensor for a rotary member, comprising:
   an emitter operable to emit a light beam,
   a rigid sleeve-shaped device having reflective surface portions forming reflectors, the reflectors being arranged at equal angular spacings from each other on an outside surface of the device, for reflecting light emitted by the emitter, the device being removably mountable about a rotary member and rotatable about an axis of rotation of the rotary member,
   a detector adapted to receive the reflected light and produce corresponding signals, and an evaluation device connected to the detector and adapted to evaluate the signals for rotary angle detection.

2. A sensor as set forth in claim 1
wherein said means having reflective surface portions comprise a rotational portion rotatable with the rotary member and having said circular-cylindrical surface, the reflectors being arranged at the periphery of the circular-cylindrical surface of the rotational portion.

3. A sensor as set forth in claim 2
wherein the circular-cylindrical surface forms the outside periphery of the rotational portion.

4. A sensor as set forth in claim 1
wherein said means having reflective surface portions are arranged on the rotary member on a circular-cylindrical surface thereof.

5. A sensor as set forth in claim 1
wherein the reflectors are formed on surface portions extending parallel to said axis.

6. A sensor as set forth in claim 1
wherein the surfaces of the reflectors are rectangular.

7. A sensor as set forth in claim 1
wherein the surfaces of the reflectors are square.

8. A sensor as set forth in claim 1
wherein the reflectors are formed by flat surfaces.

9. A sensor as set forth in claim 1
wherein the sectional view of the reflectors in a plane perpendicular to said axis of rotation is a polygon.

10. A sensor as set forth in claim 9
wherein the polygon has equal sides.

11. A sensor as set forth in claim 1
wherein the shaped portion comprises plastic material.

12. A sensor as set forth in claim 1
wherein the shaped portion is a plastic injection molding.

13. A rotary angle sensor for a rotary member, comprising:
an emitter operable to emit a light beam,
a rigid sleeve-shaped device having reflective surface portions forming reflectors, the reflectors being arranged at equal angular spacings from each other on an outside surface of the device, for reflecting light emitted by the emitter, the device being removably mountable about a rotary member and rotatable about an axis of rotation of the rotary member,
a detector adapted to receive the reflected light and produce corresponding signals, and
an evaluation device connected to the detector and adapted to evaluate the signals for rotary angle detection,
wherein the reflectors are formed by cylindrical surface portions whose cylinder axes extend parallel to the axis of rotation.

14. A sensor as set forth in claim 13
wherein said cylindrical surface portions comprise circular-cylindrical surface portions.

15. A rotary angle sensor, comprising
an emitter operable to emit a light beam,
means having reflective surface portions forming reflectors arranged at equal angular spacings from each other at the periphery of a circular-cylindrical surface on a circle rotatable about an axis of rotation of the rotary member, for reflecting light emitted by the emitter, the surface portions forming the reflectors each being of a convex or a concave configuration with respect to the emitter and detector;
a detector adapted to receive the reflected light and produce corresponding signals, and
an evaluation device connected to the detector and adapted to evaluate the signals for rotary angle detection.

16. A sensor as set forth in claim 15
wherein the reflectors are formed by immediately adjoining reflective surface portions.

17. A rotary angle sensor for a rotary member, comprising
an emitter operable to emit a light beam,
means having reflective surface portions forming reflectors arranged at equal angular spacings from each other at the periphery of a circular-cylindrical surface on a circle rotatable about an axis of rotation of the rotary member, for reflecting light emitted by the emitter, the means having reflective surface portions comprising a flexible band, the band comprising first and second mutually parallel strips arranged at a spacing and a plurality of lands between the strips, the lands forming the reflectors;
a detector adapted to receive the reflected light and produce corresponding signals, and
an evaluation device connected to the detector and adapted to evaluate the signals for rotary angle detection.

18. A sensor as set forth in claim 17,
wherein the band comprises plastic material and is reflective at least in the region of the reflectors.

19. A sensor as set forth in claim 17
wherein the band comprises plastic material and is reflective at least in the region of the lands.

20. A sensor as set forth in claim 17
wherein the band comprises metal.

21. A sensor as set forth in claim 20
wherein the band comprises hard nickel.

22. A sensor as set forth in claim 20
wherein the band comprises hard nickel.

23. A sensor as set forth in claim 17
wherein the band comprises flat surfaces and the lands are formed by removal of material from the band at the flat surfaces.

24. A sensor as set forth in claim 23
wherein the lands are produced by electroforming.

25. A rotary angle sensor for a rotary member, comprising
an emitter operable to emit a light beam,
means having reflective surface portions forming reflectors arranged at equal angular spacings from each other at the periphery of a circular-cylindrical surface on a circle rotatable about an axis of rotation of the rotary member, for reflecting light emitted by the emitter, the means having reflective surface portions comprising a flexible band,
a detector adapted to receive the reflected light and produce corresponding signals, and
an evaluation device connected to the detector and adapted to evaluate the signals for rotary angle detection.

26. A rotary angle sensor for a rotary member, comprising
an emitter operable to emit a light beam,
means having reflective surface portions forming reflectors arranged at equal angular spacings from each other at the periphery of a circular-cylindrical surface on a circle rotatable about an axis of rotation of the rotary member, for reflecting light emitted by the emitter, the means having reflective surface portions comprising first and second mutually parallel strips arranged at a spacing and a plurality of lands between the strips, a detector adapted to receive the reflected light and produce corresponding signals, and an evaluation device connected to the detector and adapted to evaluate the signals for rotary angle detection.

* * * * *